Nov. 12, 1963
E. K. KUHLES
3,110,471
CLEAN IN PLACE SANITARY VALVE
Filed Nov. 12, 1959
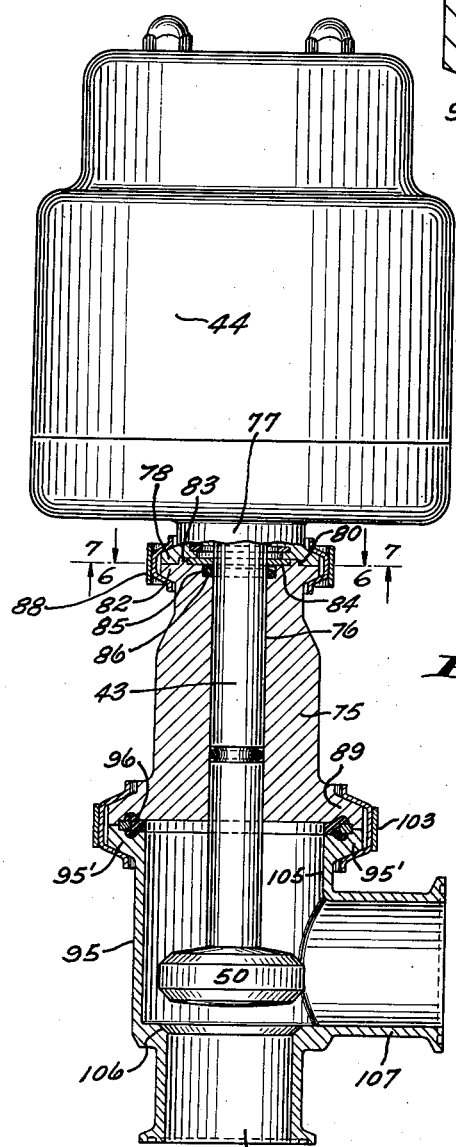
INVENTOR.
Edward K. Kuhles
BY
Morsell & Morsell
ATTORNEYS.

United States Patent Office 3,110,471
Patented Nov. 12, 1963

3,110,471
CLEAN IN PLACE SANITARY VALVE
Edward K. Kuhles, Wilmette, Ill., assignor to Ladish Co., Cudahy, Wis., a corporation of Wisconsin
Filed Nov. 12, 1959, Ser. No. 854,527
2 Claims. (Cl. 251—318)

This invention relates to improvements in clean in place sanitary valves, and is a continuation in part of application Serial No. 603,662, filed August 13, 1956, now abandoned.

The principal object of this invention is to provide a sanitary valve which is particularly adaptable for controlling the flow of foodstuffs and the like which must be handled under sanitary conditions, which is formed of two body portions which are detachably secured together so that the valve may be readily disassembled for cleaning purposes, which has a joint between the two body portions which is tightly sealed and which presents a uniform surface free from crevices in which bacteria might collect, which has a valve member and stem which is also free from crevices in which bacteria might collect, and which may be cleaned in place by a suitable cleaning solution without disassembly or removal from the foodstuff line.

A further object of the invention is to provide a construction, comprising readily detachably connected parts, which is particularly adapted for use in a motor driven valve where perfect alinement of the parts is necessary after reassembly to prevent galling action which might otherwise result from the rapid reciprocation produced by the motor actuation. Such perfect alinement is also important when there is a spring return for the valve, as misalinement might prevent such return.

A further object of the invention is to provide in a clean in place sanitary valve, comprising one part carrying the valve stem and another readily detachable part carrying a valve seat, wherein there is novel means at the joint between said two parts which insures that the valve member will always seat perfectly on the valve seat after assembly.

A more specific object of the invention is to provide a joint for the purpose above described wherein there is a combination metal and rubber sealing ring, the metal serving to provide perfect centering of the two valve body members. In addition the rubber provides for a tight seal and is so bonded to the metal that the rubber is prevented from being sucked into the valve body under negative pressure to separate from the metal, the rubber being so designed as to form a flush interior joint free from crevices.

Further objects of this invention reside in the details of construction of the clean in place sanitary valve and in the cooperative relationships between the component parts thereof.

Other objects and advantages of this invention will become apparent to those skilled in the art upon reference to the accompanying specification, claims and drawing in which:

FIG. 1 is a side elevational view partly in section of another form of clean in place motor-driven sanitary valve;

FIG. 2 is an enlarged fragmentary sectional view of one of the flanged body portions to show the gasket groove;

FIG. 3 is a fragmentary cross-sectional view through one of the gasket seals of the type adapted for use in the groove of FIG. 2;

FIG. 4 is a top view of the gasket seal of FIG. 3, parts being broken away and shown in section;

FIG. 5 is a fragmentary vertical sectional view showing cooperating flanged body parts of the type illustrated in FIG. 2 with the sealing gasket of FIGS. 3 and 4 in assembled position;

FIG. 6 is a sectional view taken on the line 6—6 of FIG. 1 with the metal washer removed and positioned alongside; and FIG. 7 is a sectional view taken on the line 7—7 of FIG. 1.

In the form of the invention illustrated in FIG. 1 there is a detachable bonnet portion 75 having a bore 76 through which the valve stem is adapted to slidably extend, said valve stem projecting slidably from a tubular guideway extension 77 at the bottom of the casing of the motor 44. The extension 77 has an outwardly flanged lower end portion 78 provided with an annular recess 79 (see FIG. 7), there being an annular shoulder 80 forming the outer margin of the recess 79. The valve stem is slidable in a bore 81 of the extension 77.

The upper end of the bonnet portion 75 is flanged as at 82 and the upper face of said flanged end has an annular rib 83 (see FIG. 6). The outer annular side of the rib 83 fits snugly against the shoulder 80 of the motor extension 77 so as to provide for perfect centering of the bonnet with respect to the motor casing whereby the bore 76 of the bonnet is in perfect alinement with the bore 81 of the motor casing extension 77.

Referring again to FIG. 6, there is a metal washer 84 whose outer periphery fits snugly within the inner annular side of the rib 83, as shown in FIG. 1. Just below the washer 84 and surrounding the upper end of the bore 76 is a counter bore 85 of rectangular cross-section adapted to receive an O-ring 86 which may be formed of suitable plastic material such as neoprene. When the metal washer of FIG. 6 is in place within the annular rib 83 as in FIG. 1, it holds the O-ring in position in the counter bore 85. It is to be noted from FIG. 1 that the thickness of the metal washer 84 is the same as the height of the annular rib 83 so that the upper portions are flush as in FIG. 1. The hole 87 of the washer is of the right size to slidably receive the valve stem.

The flanged portions 78 and 82 are adapted to be readily detachably held in the assembled condition of FIG. 1 by a readily removable clamping band 88 having tapered portions as shown in the cross-section of FIG. 1 which act on the usual annular tapered faces of the flange portions 78 and 82 to draw the flanges into tight assembled condition when the clamping band is taken up, as is common practice.

The lower end of the bonnet 75 has an outwardly flanged connecting portion 89 with an annular externally tapered face 90. Referring to FIG. 5, the lower end face of the flange portion 89 has an annular gasket-receiving groove which comprises an inner annular portion 91 having a flat bottom, and a deeper portion 92, there being an annular inclined portion 93 extending from the portion 91 to the deepest part of the groove 92. Surrounding the groove portion 92 is a groove portion 94 of less depth which is of rectangular cross-section, as shown in FIG. 5. The outer portion of 92 is on a radius as is clear from FIG. 5.

A readily detachable valve body portion 95 has an outwardly flanged upper end portion 95' matching the flange portion 89 of the bonnet, as shown in FIG. 5. The flange portion 95' is illustrated alone in FIG. 2. It has a groove in its end face which is like the groove in the lower face of the bonnet flange 89. Like portions of the groove of FIG. 2 are designated by the same numerals as the groove of the bonnet flange 89, except that the numerals are primed in FIG. 2.

These two grooves complement each other in assembly, as shown in FIG. 5, to receive and accommodate a novel sealing gasket 96, as shown in FIGS. 3 and 4. This gasket has an inner annular portion 96' formed of suitable relatively hard but resilient plastic such as "Sirvene" 4178. The upper and lower surfaces of the plastic are annularly grooved as at 97 and on the inner side of the groove is a gasket portion 98 which is outwardly flared in cross section, having a slightly concave inner periphery 99. On the other side of the groove the upper and lower faces of the gasket have rounded annular bead portions 100. The outer periphery of the gasket portion 98 has an annular groove 101 of rectangular cross-section for receiving part of a metal ring 102. The rest of the metal ring 102 projects outwardly beyond the periphery of the gasket portion 96'.

In assembly, any well-known type of detachable clamping ring 103 may be employed which has tapered portions 104 to act on the tapered surfaces 90 and 90' to draw the two flanged portions 96 and 89 together. With the gasket of FIGS. 3 and 4 in place, this will cause squeezing of the flared portion 98 of the resilient part of the gasket together between the flat metal surfaces 91 and 91' to deform and straighten out this part of the resilient gasket from the condition of FIG. 3 to the condition of FIG. 5. During such movement the concave inner periphery 99 of the gasket straightens out and moves outwardly slightly to become flush with the bore 105 of the valve body part 95. At the same time the annular bead portions 100 of FIG. 3 are flattened out somewhat to fill the grooves 92 and 92' and to fit the inclines 93 and 93', as shown in FIG. 5. The outwardly projecting portion of the metal ring 102 fits perfectly within the groove portions 94 and 94' and serves to perfectly center the valve body 95 with respect to the bonnet 75.

Inasmuch as the novel connection heretofore described and shown in FIGS. 1, 6 and 7 serves to center the bonnet 75 perfectly with respect to the motor and motor casing 45, it is clear that all of the parts are assembled in such a manner that the valve stem is maintained in perfect alinement with all of the readily detachable parts. Thus the valve member 50 will seat perfectly on the seat 106 during operation of the valve. This is true in spite of the fact that the valve part 95 is readily disconnectable for cleaning. Such perfect seating and perfect alinement is particularly important where the valve is actuated by a motor such as the motor 44 because if there is not perfect alinement there is likely to be galling due to the rapid motor actuation of the valve. Furthermore, improper alinement in assembly might even prevent return of the valve to open position.

While only one form of this invention has been illustrated, other forms thereof may become apparent to those skilled in the art upon reference to this disclosure, and therefore this invention is to be limited only by the scope of the appended claims.

Reference is made to divisional application Serial No. 90,517, filed February 20, 1961.

What I claim is:

1. In a valve having a tubular body with a valve seat, said body having an opening surrounded by an outwardly projecting end flange spaced from said valve seat and said end flange having an annular end joint-face provided with an annular groove, the opposite face of said flange being outwardly tapered, the improvement comprising a bonnet having an outwardly projecting cooperating end flange like the end flange of said valve body and having a grooved joint-face positioned against the grooved joint-face of said valve body and having an opposite tapered face, said bonnet having a valve stem bore, a valve stem carried by the bonnet and slidably positioned in said bore and guided thereby and having a free end projecting freely into the valve body, a valve member on said end positioned to close against said valve seat when the valve is in closing position and of a size to readily withdraw from said valve body opening when the parts are disassembled, readily detachable clamping means coacting with said tapered faces of the flanges to draw said flanges together, an annular sealing gasket of resilient material interposed coaxially between said annular end faces and having oppositely disposed preformed annular ribs received in said annular grooves of the joint-faces of the flanges, each of said joint-faces having an annular shoulder of metal spaced outwardly from said resilient gasket, an annular metal ring surrounding said resilient gasket and connected thereto and having an outwardly projecting portion whose outer periphery is against the shoulders of both annular flanges to positively aline said valve member with said valve seat when the clamping means is in clamping position with respect to the tapered faces of the flanges, said resilient material being within said metal ring and being compressed by the clamping means to seal the joint.

2. In a valve having a tubular body with a valve seat, said body having an opening surrounded by an outwardly projecting end flange spaced from said valve seat and said end flange having an annular end joint-face provided with an annular groove, the opposite face of said flange being outwardly tapered, the improvement comprising a bonnet having an outwardly projecting cooperating end flange like the end flange of said valve body and having a grooved joint-face positioned against the grooved joint-face of said valve body and having an opposite tapered face, said bonnet having a valve stem bore, a valve stem carried by the bonnet and slidably positioned in said bore and guided thereby and having a free end projecting freely into the valve body, a valve member on said end positioned to close against said valve seat when the valve is in closing position and of a size to readily withdraw from said valve body opening when the parts are disassembled, readily detachable clamping means coacting with said tapered faces of the flanges to draw said flanges together, an annular sealing gasket of resilient material interposed coaxially between said annular end faces and having oppositely disposed preformed annular ribs received in said annular grooves of the joint-faces of the flanges, each of said joint-faces having an annular shoulder of metal spaced outwardly from said resilient gasket, an annular metal ring surrounding said resilient gasket and connected thereto and having an outwardly projecting portion whose outer periphery is against the shoulders of both annular flanges to positively aline said valve member with said valve seat when the clamping means is in clamping position with respect to the tapered faces of the flanges, said resilient material being within said metal ring and being compressed by the clamping means to seal the joint and so that its inner annular edge is flush with the inner surface of the valve member.

References Cited in the file of this patent

UNITED STATES PATENTS

| | | |
|---|---|---|
| 1,519,571 | Wilson | Dec. 16, 1924 |
| 2,066,523 | Ewart | Jan. 5, 1937 |
| 2,271,425 | Harris | Jan. 27, 1942 |
| 2,282,312 | Halstead | May 12, 1942 |
| 2,541,951 | Twyman | Feb. 13, 1951 |
| 2,635,900 | Mayo | Apr. 21, 1953 |
| 2,761,707 | Herman | Sept. 4, 1956 |
| 2,794,615 | Tolleson | June 4, 1957 |
| 2,842,284 | Flick | July 8, 1958 |
| 2,883,145 | Sage | Apr. 21, 1959 |
| 2,969,811 | Freeman | Jan. 31, 1961 |

FOREIGN PATENTS

| | | |
|---|---|---|
| 692,571 | Great Britain | of 1953 |